United States Patent
Thomas et al.

(10) Patent No.: US 11,818,413 B2
(45) Date of Patent: Nov. 14, 2023

(54) SYSTEM AND METHOD FOR DYNAMIC GENERATION OF CHARTS IN A PERSONALIZED VIDEO

(71) Applicant: Infosys Limited, Bangalore (IN)

(72) Inventors: Reshma Thomas, Chennai (IN); Sowbarnika Sivasankaran, Chennai (IN); Pradeepraj Rajendran, Tiruvannamalai (IN); Sunil Gupta, Ambala (IN); Guruprasad Nellitheertha Venkataraja, Bangalore (IN)

(73) Assignee: INFOSYS LIMITED, Bangalore (IN)

( * ) Notice: Subject to any disclaimer, the term of this patent is extended or adjusted under 35 U.S.C. 154(b) by 202 days.

(21) Appl. No.: 17/345,607

(22) Filed: Jun. 11, 2021

(65) Prior Publication Data

US 2021/0306691 A1    Sep. 30, 2021

Related U.S. Application Data

(63) Continuation-in-part of application No. 16/809,295, filed on Mar. 4, 2020, now Pat. No. 11,166,061.

(30) Foreign Application Priority Data

Dec. 17, 2019   (IN) .............................. 201941052391
Sep. 30, 2020   (IN) .............................. 202043042549

(51) Int. Cl.
*H04N 21/2668*   (2011.01)
*H04N 21/458*   (2011.01)
(Continued)

(52) U.S. Cl.
CPC ....... *H04N 21/2668* (2013.01); *G06F 16/735* (2019.01); *G06F 16/738* (2019.01);
(Continued)

(58) Field of Classification Search
CPC ........... H04N 21/2668; H04N 21/2353; H04N 21/458; H04N 21/84; H04N 21/26258;
(Continued)

(56) References Cited

U.S. PATENT DOCUMENTS 9,330,719 B2    5/2016   Axen et al.
10,491,947 B1    11/2019  Weisman et al.
(Continued)

FOREIGN PATENT DOCUMENTS

| WO | 2006105480 A1 | 10/2006 |
| WO | 2007098260 A2 | 8/2007 |
| WO | 2015187048 A1 | 12/2015 |

OTHER PUBLICATIONS

Hiemstra, Siebe, "Creating Dynamic Videos Using JavaScript and After Effects: The Basics", https://www.themarketingtechnologist.co/creating-dynamic-videos-using-javascript-and-after-effects-the-basics/, Dec. 4, 2015.
(Continued)

*Primary Examiner* — Anthony Bantamoi
(74) *Attorney, Agent, or Firm* — Troutman Pepper Hamilton Sanders LLP (Rochester)

(57) ABSTRACT

A method and/or system for dynamic generation of charts in a personalized video content is disclosed. A client device may receive user data, a video template and a metadata associated with the video template over a computer network. The dynamic generation of the personalized video is performed at the client device by transforming the user data to a graphical overlay elements using charting libraries by generating an enriched data object based on the user data and the metadata. The graphical overlay elements are overlaid dynamically on top of the video template while playing the video template at the client device.

18 Claims, 8 Drawing Sheets

(51) Int. Cl.
*G06F 16/735* (2019.01)
*H04N 21/84* (2011.01)
*G06F 16/787* (2019.01)
*H04N 21/235* (2011.01)
*G06F 16/738* (2019.01)

(52) U.S. Cl.
CPC ....... *G06F 16/787* (2019.01); *H04N 21/2353* (2013.01); *H04N 21/458* (2013.01); *H04N 21/84* (2013.01)

(58) Field of Classification Search
CPC ........... H04N 21/4331; H04N 21/4532; H04N 21/812; H04N 21/854; H04N 21/8543; H04N 21/8586; H04N 21/47205; G06F 16/735; G06F 16/738; G06F 16/787; G06F 16/438; G06F 16/972; G11B 27/031
See application file for complete search history.

(56) References Cited

U.S. PATENT DOCUMENTS

| | | | |
|---|---|---|---|
| 2004/0030599 A1* | 2/2004 | Sie | G06F 17/60 |
| 2008/0228901 A1* | 9/2008 | Choi | G06F 15/177 |
| 2010/0023863 A1 | 1/2010 | Cohen-Martin | |
| 2012/0308211 A1 | 12/2012 | Xu et al. | |
| 2014/0040257 A1* | 2/2014 | Chanrasekaran | G06F 17/30 |
| 2016/0212455 A1 | 7/2016 | Manna | |
| 2018/0376178 A1 | 12/2018 | Cormican | |
| 2019/0311036 A1 | 10/2019 | Shanmugam | |
| 2020/0234483 A1* | 7/2020 | Mashrabov | H04L 12/58 |

OTHER PUBLICATIONS

Extended European Search Report, dated Feb. 17, 2022.
Exteneded European Search Report, EP Application No. 22160861.5, dated Sep. 2, 2022.

* cited by examiner

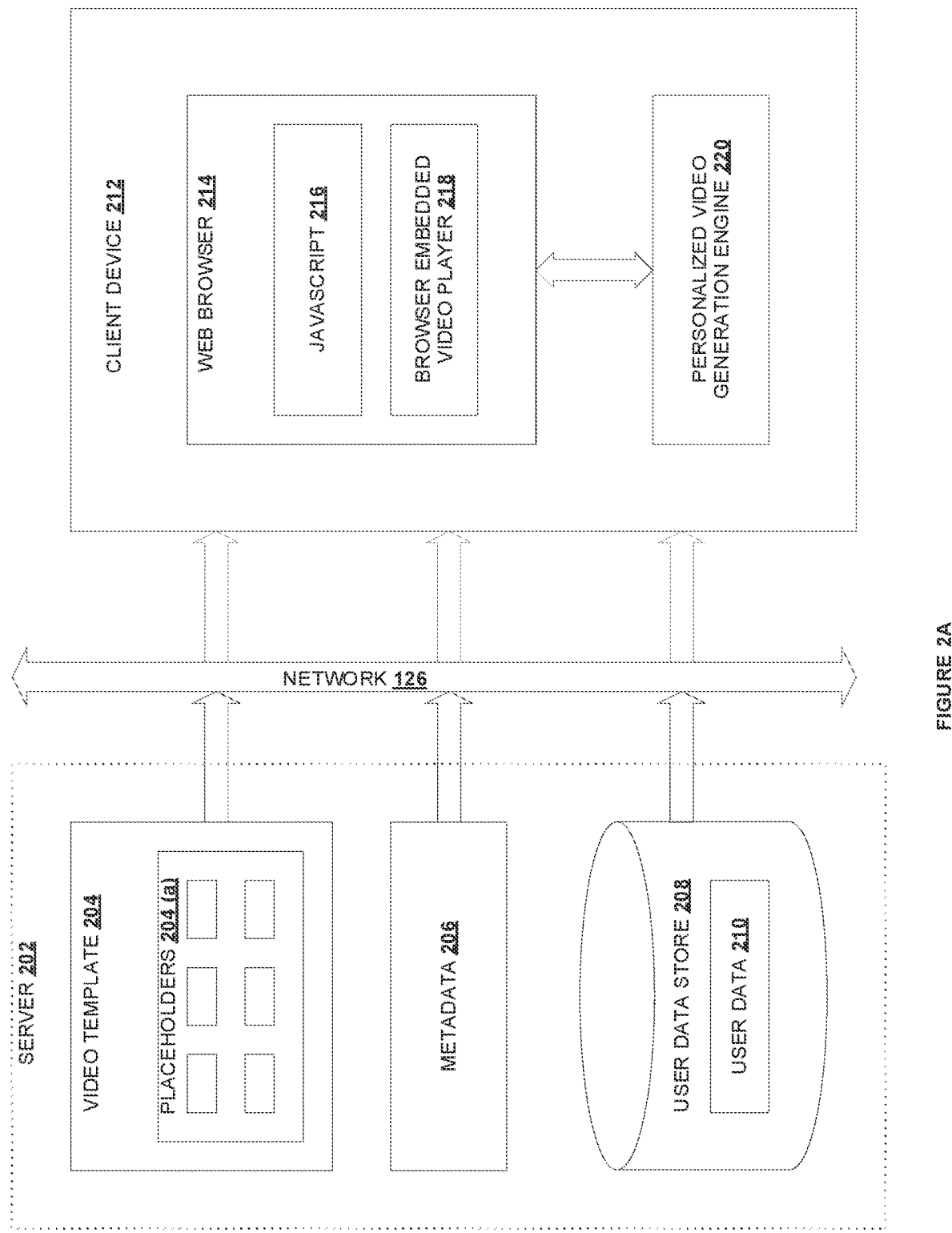

SYSTEM AND METHOD FOR DYNAMIC GENERATION OF CHARTS IN A PERSONALIZED VIDEO

This application claims priority to Indian Patent Application Serial No. 202043042549, Sep. 30, 2020, and is a continuation-in-part application of U.S. application Ser. No. 16/809,295, filed Mar. 4, 2020, which claims priority from Indian Patent Application Serial No. 201941052391, filed Dec. 17, 2019, which is hereby incorporated by reference in its entirety.

FIELD

The present technique relates to a system, method for generating a personalized video content. More specifically, the technique relates to dynamic generation of charts in a personalized video content using web technologies.

BACKGROUND

Companies constantly look for providing distinctive experience for their customers by not only providing important information, but also emphasizing the relevance of that information. Making every communication count is one of the key differentiators in the field of customer experience. For example, in an insurance company, there may be multiple communication channels through which an insurer interacts with the customer; from sending out flyers and prospects to providing quotes, leads and statements. Often, the customer either fails to read the important information from these verbose documents, or has difficulty in understanding them. These communication gaps lead to disengaged customers, which in turn may lead to repeated customer service interactions, and subsequently, a dissatisfied customer, and lower conversion rates.

In the past few years, videos are replacing the plain, boring, textual content online. It is generally in the form of mass marketing content which is still less effective, as it lacks personalization. Customers still need to go through information to filter out and understand what is relevant to them and what is not. Customers thus have begun to expect communication that is tailored to their needs, instead of mass marketing.

One of the approaches to deliver personalized video experience is by creating one video per person. In this approach, content management is cumbersome, as every unique personalized video generated for each user needs to be stored in a database and hosted on server. The content also needs to be optimized for delivery across multiple devices, and streamed thereof. This process is not very scalable. As the number of users increase so do the number of videos, management of those videos and delivery become cumbersome over a period of time. It is also extremely expensive, considering production costs, storage costs, and delivery costs. The requirement of extensive setup for delivery of large volume of videos make the process cumbersome. Also, other personalized video offerings in market, the generation happens using server side technologies, which would consume huge processing power and would need personal data to be passed to personalized video processing servers. All these cost more infrastructure, processing time, and effort. Passing on personal data to video processing servers brings responsibility for personalized video service providers to add security checks to protect data. Hence there is need to overcome the above-mentioned problem.

SUMMARY

Presently, most of the personalized video experience to the user is achieved by generating video for each person or the processing of the video is performed on servers, stored and the streamed to the user based on the user request which may consume more resources of servers and network. The present disclosure overcome the above mentioned problem using a single video template for a personalization campaign, by dynamically overlaying the personalization parameters including real-time charts on top of a video template using browser capabilities of the client device associated with the end user.

Disclosed are a system, a method and/or non-transitory computer readable storage medium for a dynamic generation charts in a personalized video content through web technologies.

In one aspect, a computer implemented method for dynamic generation of charts in a personalized video content is disclosed. The method comprising, receiving a request from a user at a client device to generate a personalized video. Based on the request, at least one video template and a video configuration metadata associated with the at least one video template is received at the client device. The at least one video template may comprise one or more placeholders. The video configuration metadata may comprise customizable configuration parameters. The at least one video template may be received over a computer network or accessed as an offline file stored at the client device. The at least one video template may be dynamically selected from a set of video templates, based on user profiles. The at least one video template may be dynamically selected from set of video templates, based on capabilities of the client device. User data of a user is extracted by the client device from at least one user data source. The user may be authenticated at the client device before the extraction of user data, based on the preferences associated with the user data. The user data may be obtained from one or more of a geo-location of the user and/or an encoded URL. An enriched data object is created based on the extracted user data and the video configuration metadata, by populating the customizable configuration parameters of the video configuration metadata with the extracted user data. The enriched data object is parsed at the client device to generate one or more graphical overlay elements by transforming the user data to chart information. The one or more placeholders are populated with corresponding one or more graphical overlay elements at the client device based on chart properties. A personalized video content is displayed at the client device by dynamically arranging the one or more graphical overlay elements over the at least one video template. The personalized video content may be displayed on the client device through a browser embedded video player. The personalized video content may temporarily be stored in a memory at the client device.

In another aspect, a system for dynamic generation of charts in a personalized video content is disclosed. The system comprising one or more components, but not limited to client device capable communicatively coupled to storage devices, capable of displaying a multi-media content through browser, wherein the client device is configured to receive a request from a user at a client device to generate a personalized video. Based on the request, at least one video template and a video configuration metadata associated with the at least one video template is received at the client device. The at least one video template may comprise one or more placeholders. The video configuration metadata may comprise customizable configuration parameters. The at least one video template may be received over a computer network or accessed as an offline file stored at the client device. The at least one video template may be dynamically selected from a set of video templates, based on user profiles. The at least one video template may be dynamically selected from set of video templates, based on capabilities of the client device. User data of a user is extracted by the client device from at least one user data source. The user may be authenticated at the client device before the extraction of user data, based on the preferences associated with the user data. The user data may be obtained from one or more of a geo-location of the user and/or an encoded URL. An enriched data object is created based on the extracted user data and the video configuration metadata, by populating the customizable configuration parameters of the video configuration metadata with the extracted user data. The enriched data object parsed at the client device to generate one or more graphical overlay elements by transforming the user data to chart information. The one or more placeholders are populated with corresponding one or more graphical overlay elements at the client device based on chart properties. A personalized video content is displayed at the client device by dynamically arranging the one or more graphical overlay elements over the at least one video template. The personalized video content may be displayed on the client device through a browser embedded video player. The personalized video content may temporarily be stored in a memory at the client device In yet another aspect, a non-transitory computer readable storage medium for dynamic generation of charts in a personalized video content is disclosed. The non-transitory compute readable storage medium comprising machine executable code which when executed by at least one processor, causes the at least one processor to perform steps such as, receiving a request from a user at a client device to generate a personalized video. Based on the request, at least one video template and a video configuration metadata associated with the at least one video template is received at the client device. The at least one video template may comprise one or more placeholders. The video configuration metadata may comprise customizable configuration parameters. The at least one video template may be received over a computer network or accessed as an offline file stored at the client device. The at least one video template may be dynamically selected from a set of video templates, based on user profiles. The at least one video template may be dynamically selected from set of video templates, based on capabilities of the client device. User data of a user is extracted by the client device from at least one user data source. The user may be authenticated at the client device before the extraction of user data, based on the preferences associated with the user data. The user data may be obtained from one or more of a geo-location of the user and/or an encoded URL. An enriched data object is created based on the extracted user data and the video configuration metadata, by populating the customizable configuration parameters of the video configuration metadata with the extracted user data. The enriched data object is parsed at the client device to generate one or more graphical overlay elements by transforming the user data to chart information. The one or more placeholders are populated with corresponding one or more graphical overlay elements at the client device based on chart properties. A personalized video content is displayed at the client device by dynamically arranging the one or more graphical overlay elements over the at least one video template. The personalized video content may be displayed on the client device through a browser embedded video player. The personalized video content may temporarily be stored in a memory at the client device.

The method, the system, and/or the non-transitory computer readable storage medium disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 2A is an architecture diagram illustrating a client device and associated components for in a system for dynamic generation charts in a personalized video content, according to one or more embodiments.

Other features of the present embodiments will be apparent from the accompanying drawings and from the detailed description that follows.

DETAILED DESCRIPTION

The objective of invention in the present disclosure is to overcome the technical problem mentioned in the background section through a system for dynamic generation of charts in a personalized video content using web technologies.

In one or more embodiments, a method, system and/or computer readable storage medium for dynamic generation of charts in a personalized video content using web technologies is disclosed. The method comprising, receiving a request from a user at a client device to generate a personalized video. Based on the request, at least one video template and a video configuration metadata associated with the at least one video template is received at the client device. The at least one video template may comprise one or more placeholders. The video configuration metadata may comprise customizable configuration parameters. The at least one video template may be received over a computer network or accessed as an offline file stored at the client device. The at least one video template may be dynamically selected from a set of video templates, based on user profiles. The at least one video template may be dynamically selected from set of video templates, based on capabilities of the client device. User data of a user is extracted by the client device from at least one user data source. The user may be authenticated at the client device before the extraction of user data, based on the preferences associated with the user data. The user data may be obtained from one or more of a geo-location of the user and/or an encoded URL. An enriched data object is created based on the extracted user data and the video configuration metadata, by populating the customizable configuration parameters of the video configuration metadata with the extracted user data. The enriched data object is parsed at the client device to generate one or more graphical overlay elements by transforming the user data to chart information. The one or more placeholders are populated with corresponding one or more graphical overlay elements at the client device based on chart properties. A personalized video content is displayed at the client device by dynamically arranging the one or more graphical overlay elements over the video template. The personalized video content may be displayed on the client device through a browser embedded video player. The personalized video content may temporarily be stored in a memory at the client device.

Figure 1:
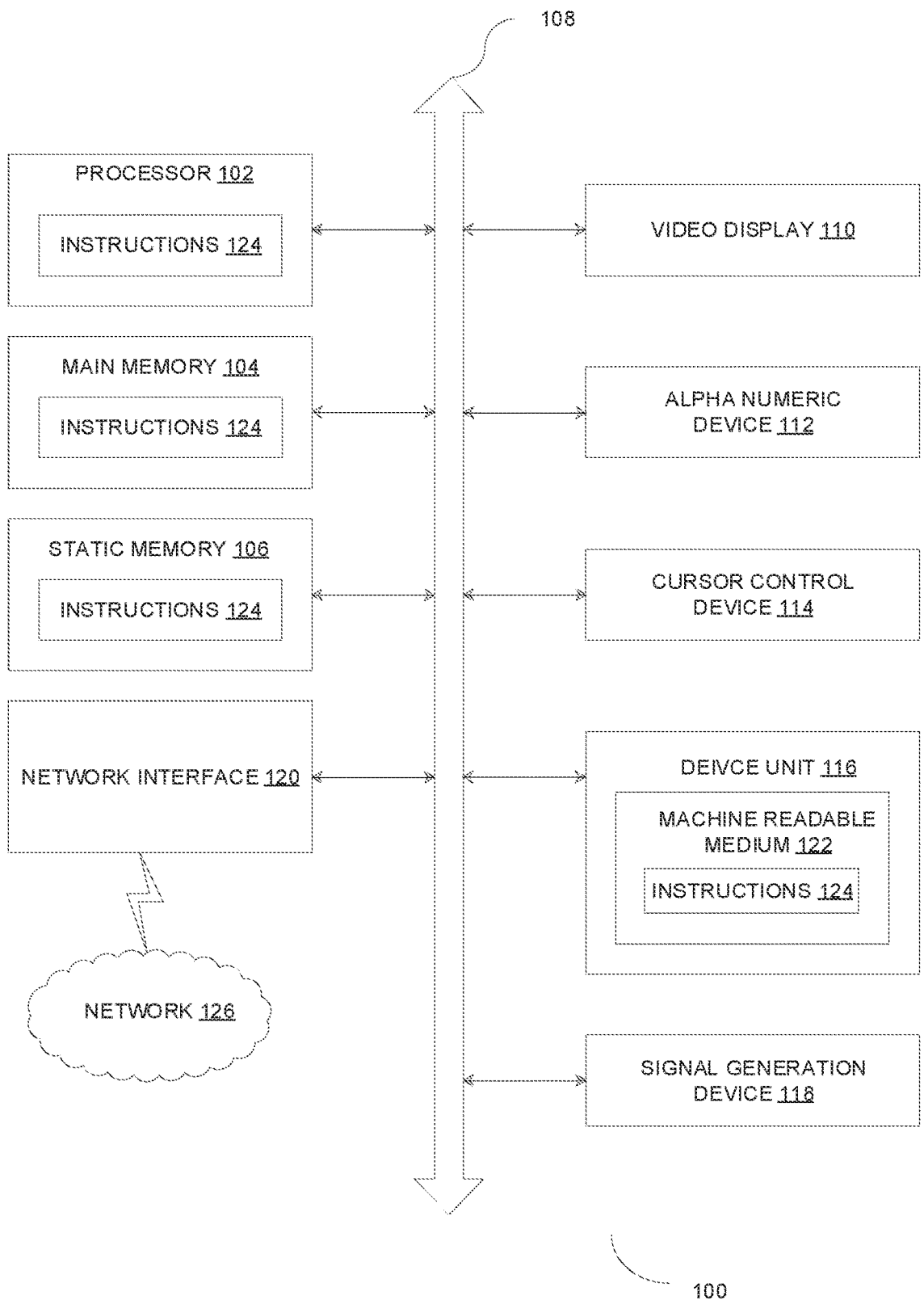
FIG. 1 is a diagrammatic representation of a data processing system capable of processing a set of instructions to perform any one or more of the methodologies herein, according to one or more embodiments.

FIG. 1 is a diagrammatic representation of a machine and/or data processing device capable of processing a set of instructions to perform any one or more of the methodologies herein, according to one embodiment. The machine and/or the data processing device in the example form, comprises a computer system 100 within which a set of instructions, for causing the machine to perform any one or more of the methodologies discussed herein, may be executed. In various embodiments, the machine operates as a standalone device and/or may be connected (e.g., networked) to other machines.

A machine may be a personal computer (PC), laptop or an embedded system and/or any machine capable of executing a set of instructions (sequential or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker), micro controller 128 (e.g., programmable logic controller) and a network interface 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104, within the static memory 106 and/or within the processor 102 during execution thereof by the computer system 100, the main memory 104 and the processor 102 also constituting machine-readable media.

The instructions 124 may further be transmitted and/or received over a network 126 via the network interface 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical media and magnetic media.

FIG. 2A is an architecture diagram illustrating a client device and associated components for in a system for dynamic generation of charts in a personalized video content, according to one or more embodiments. In one or more embodiments, the system may comprise one or more components, but not limited to a sever 202, video template 204 comprising one or more placeholders 204(a), a metadata 206, user data store 208 configured to store user data 210 and/or client device 212. The client device 212 may be communicatively coupled to the server 202 through a computer network 126. The client device 212 may comprise one or more components, but not limited to web browser 214 and personalized video generation engine 220. The web browser 214 may comprise a browser embedded video player 218 and may further be capable of executing one or more instructions in JavaScript 216 which is one of the various programming languages supported by the web browser 214.

In one or more embodiments, the video template 204 may be a video file comprising one or more placeholder 204(a) in each frame of the video wherein the video file may be customized to meet the requirement based on one or more rules. The one or more placeholders 204(a) may be such layouts in terms of set of pixels in each frame of a video template 204, identified using timestamps, that temporarily takes the place of final data or information to be displayed to the user at the client device 212. The one or more placeholders 204(a) may also take geometrical shapes in the video template, defined during the creation of video template 204. The one or more placeholders 204(a) may be populated with data of different format such as, but not limited to texts, hyperlinks, images, videos, graphical objects and animations. Along with the one or more placeholders 204(a), the video template 204 may also be associated with one or more multimedia objects such as, but not limited to images, video clips, audio files (sound tracks, narration), texts and/or animations. The video template 204 may include a theme or story related to the topic of interest of the user based on user preferences or profile data of the user. Each video template may be designed differently to offer various styles in the generation of a personalized video.

In one or more embodiments, the metadata 206 (also referred as video configuration metadata 206) may comprise video configuration parameters such as, but not limited to, one or more placeholders 204(a), timestamps associated with the one or more placeholders 204(a), alignment and position information of the one or more placeholders 204(a), and/or data type of information to be populated to the one or more placeholders 204(*a*). For example, if a text to be overlaid on the one or more place holders 204(*a*), the metadata 206 may comprise video configuration parameters such as, but not limited to, font size, font style, colour, animation and/or opacity of the text. The system may be configured to store one or more video templates 204 and each of the one or more video templates 204 may be associated with plurality of metadata 206.

In one or more embodiments, the user data store 208 may be a storage device associated with the server 202 (also referred as 'storage server' 202) configured to store user data 210 associated with one or more users. The user data store 208 may be communicatively coupled to the client device 212 over a computer network 126. In one or more embodiments, the sources of user data may be an online or offline data sources, such as, but not limited to, one or more web pages, computer readable files, RSS feeds and/or web services. In one or more embodiments, the user data store 208 may be part of client device 212. The user data 210 may comprise various types of information provided by the user (e.g., demographics data, personal information, geo-location data etc.) and associated with a specific entity that user is associated with (e.g. car insurance, bill statements, customized information for user). The entities may communicate the information to the user which is personalized for the user as disclosed in various embodiments of the present disclosure. For example, the user may hold a Health Insurance account and the user data 210 may contain information such as plan chosen by the user, premium amount, coverage etc. In other examples, the user data 210 may include information from third-party sources such as, but not limited to, credit card companies, banks, social networking websites and/or email services. The user profile may be a part of user data 210 and may be configurable by the user via a network application (e.g., a web page), which may comprise preferences of the user on what information and how such information to be communicated to the user. In some embodiments, the user data 210 may be encoded in the form of Uniform Resource Locator (URL) as query parameters or relative URLs and may be received at the client device 212. In such cases, the user data 210 may be extracted from the URLs or any webpage associated with the URLs and such data may be extracted by parsing the webpage and used to replace the one or more placeholders 204(*a*) in the video template 204. For example, an image placeholder may be replaced with an image file extracted from the webpage, a title placeholder may be replaced with an associated text extracted from the webpage. The user may also log in using the client device 212 and update user data 210 associated with delivery of personalized video content through web browser 214. In some embodiments, the user data may be received from the user while displaying a personalized video content and dynamically generate/update charts in the personalized video content in real-time.

In one or more embodiments, the client device 212 may be a computing device comprising network interface component which enables users to connect to server 202 through a computer network 124. The client device 212 may be configured to display digital multimedia contents through browser or any other application capable of displaying the digital multimedia contents. The client device 212 may be at least one of, but not limited to personal computer, a video player, a personal handheld device like smartphones and/or personal digital assistant (PDA) which is capable of displaying digital multimedia contents. The client device 212 may comprise one or more components, but not limited to web browser 214 and personalized video generation engine 220.

In one or more embodiments, the web browser 214 may comprise a browser embedded video player 218 and may further be capable of executing one or more instructions of JavaScript 216 or any such programming language supported by the web browser 214. The browser embedded video player 218 may be configured to display digital multimedia content such as video and/or audio files of any format that are well known in the digital content domain. The web browser 214 may be configured to receive one or more instructions from the user associated with the client device 212 and send request a server 202 or a data storage devices storing the one or more video templates 204, metadata 206 and/or the user data 210. The web browser 214 may use one or more network protocols such as, but not limited to Transmission Controller Protocol (TCP), Internet Protocols (IP), File Transfer Protocol (FTP) and/or Hyper Text Transfer Protocol (HTTP) to communicate with server 202 and/or data storage devices. The JavaScript 216 may comprise one or more instructions to cause web browser 214 and browser embedded video player 218 to process metadata 206, video template 204, user data 210, to dynamically generate a personalized video content through personalized video generation engine 220 and display through the browser embedded video player 218 in real-time. The personalized video generation engine 220 is described in detail in subsequent paragraphs of the present disclosure. The browser embedded video player 218 may be configured to receive one or more inputs from the user causing selection of dynamic data objects to produce the personalized video content. One or more rules and/or heuristic methods may be applied to determine how to associate the dynamic data objects with the one or more placeholders 204 (*a*). The functionalities of the system for dynamic generation of charts in a personalized video content and the communication between each components of the system is described in subsequent paragraphs of the present disclosure.

Figure 2B:
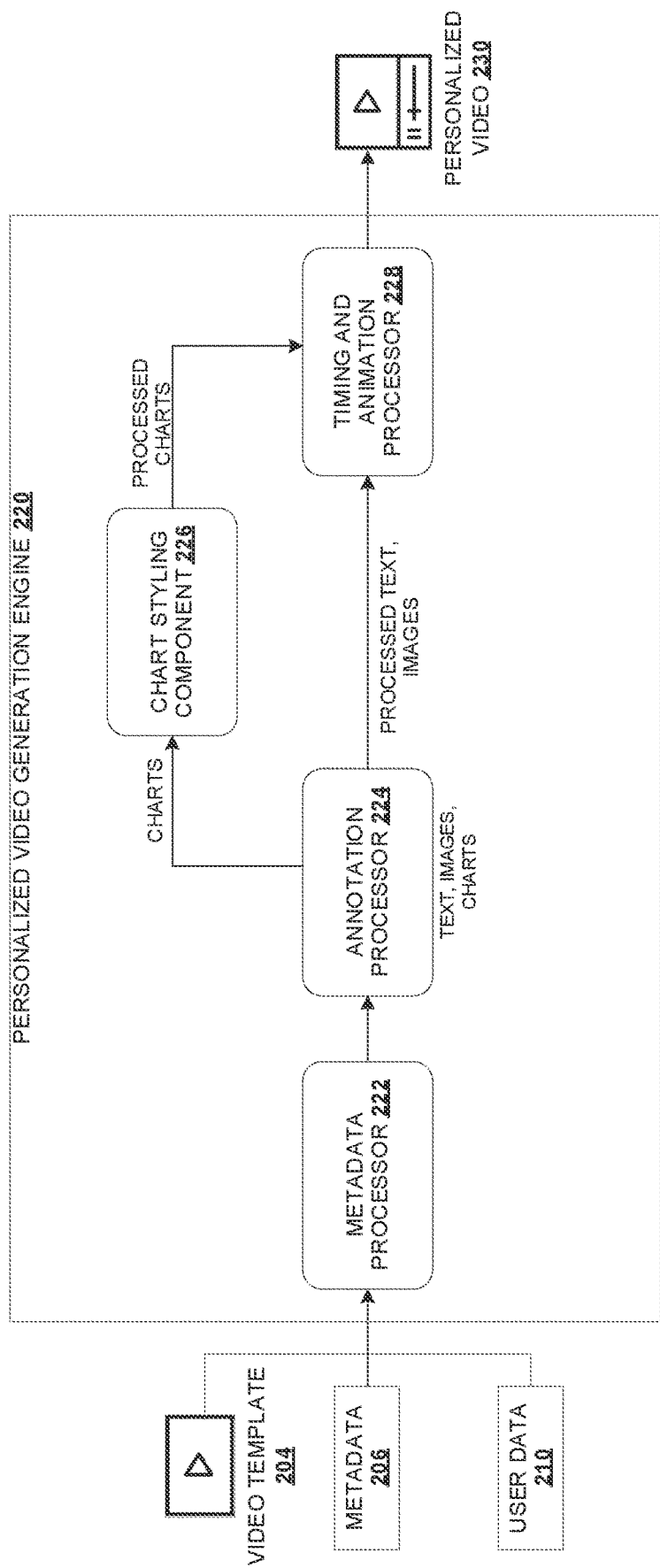
FIG. 2B is an architecture diagram illustrating a system for dynamic generation charts in a personalized video content, according to one or more embodiments.

FIG. 2B is an architecture diagram illustrating a system for dynamic generation of charts in a personalized video content, according to one or more embodiments. In one or more embodiments, the system may comprise one or more components, but not limited to, video template 204, metadata 206, user data 210, metadata processor 222, annotation processor 224, chart styling component 226, timing and animation processor 228 and/or personalized video 230. The components such as video template 204, metadata 206 and user data 210 are described in previous paragraphs of the present disclosure.

Figure 4:
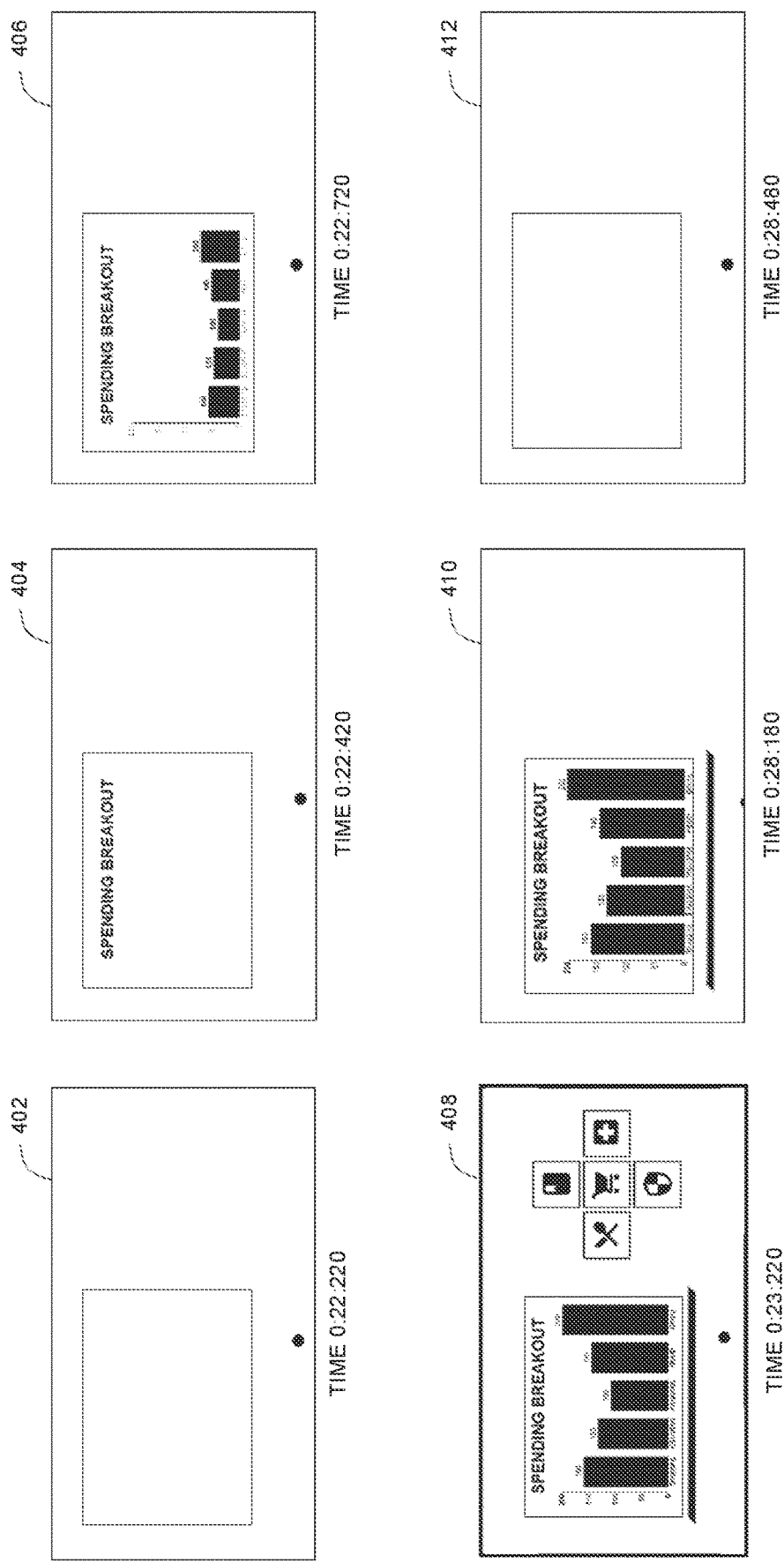
FIG. 4 is an exemplary illustration of various frames with timestamps of the respective frames of the personalized video content, according to one or more embodiments.

In one or more embodiments, the metadata processor 222 may be configured to receive at least one video template 204, the metadata 206 associated with the at least one video template 204 and the user data 210. The metadata processor 222 may select the at least one video template 204 from the pool of video templates stored at the server 202 based on user preference stored as part of user data 210 in user data store 208 and/or video processing and video rendering capabilities of the client device 212. The metadata processor 222 may be configured to process metadata by parsing the metadata 206 to extract annotation data from the metadata 206. The annotation data may comprise elements such as text, image and/or charts which are overlaid on a video template to generate a personalized video content. The extracted annotation data along with the at least one video template 204 and user data 210 may be communicated to the annotation processor 224. The annotation processor 224 may be configured to generate personalized form of various annotations such as, but not limited to, text, image and/or charts based on the user data 210 and the processed metadata 206. Annotations are user-defined objects or shapes drawn on a chart. Annotations increase the visual appeal of the charts and make them more informative. Annotations help end users interpret charts better. Annotations may be of different shapes, images, and text annotations. Charts may be of various types such as bar, pie etc. Based on the user data 210 and the user preferences associated with the user data, the types of charts may be selected dynamically by the annotation processor 224. For example, the use data 210 of expenditure pattern (in USD) of one user is 20K, 20K and 35K in last three quarters, and for another user it could be 15K, 40K and 10K. The bar sizes may be different for these two users, assuming that bar chart is used to represent this information based on the user preferences. This mapping of user data 210 to charts may be performed by annotation processor 224. The steps of generating personalized chart annotations are described in relation with FIG. 2C in subsequent paragraphs. After generating the personalized chart annotations, the annotation processor 224 may send the personalized chart annotations to chart styling component 226. Also, the annotation processor 224 may simultaneously send such personalized form of annotations which do not require chart styling effects (i.e. images, texts etc.) to the timing and animation processors 228 so that non-chart annotations may be processed with timing and animation processor 228 thereby causing improvised job scheduling and parallel processing. The chart styling component 226 may be configured to receive personalized chart annotations, access various styling options from the metadata 206 and append them to the personalized chart annotations created in the form of CSS (Cascading Style Sheets) file/format. The one or more styling options applied by the chart styling component 226 may be such as, but not limited to apply styling on chart such as setting height, width, padding and positioning and/or setting up of other properties like font size, colour of the label and other data elements within the charts, axis lines, bars/lines/sections of the chart and orientation of charts and labels, etc. The timing and annotation processor 228 may be configured to receive processed chart annotations from chart styling component 226, and processed text and image annotations from annotation processor 224 to create time bound overlays, entry and exit animation for each of the processed annotations. The time bound overlays may be used to synchronize the user data that needs be overlaid on the one or more placeholders in the form of charts with the timestamp as defined in the metadata 206. The entry and exit animations may define the dynamic representation of user data in the form of charts associated with timestamps as defined in the metadata 206. FIG. 4 of the present disclosure illustrates the time bound overlays and the entry and exit animations along with the timestamps of the video frames of the exemplary personalized video. After the processing at the timing and animation processor 228, a personalized video 230 may be displayed through a browser embedded video player 218, wherein the personalized video is displayed using at least one of, but not limited to, display drivers associated with the client device 212, plug-ins associated with the web browser 214 and/or dedicated Graphics Processing Unit (GPU) associated with the client device 212. The user may be provided with controls to play, pause and/or navigate the personalized video rendered through the browser embedded video player 220. During the display of the personalized video at the client device 212, the user may select data displayed on the video which may cause at least one of, but not limited to, expanded information of the selected data, navigation to another personalized video which may be generated as discussed in various embodiments of the present disclosure. The personalized video 230 may optionally be stored at the client device 212. In one or more embodiments, all the components of the personalized video generation engine 220 may process the data and render all the frames of the personized video 230 and then render a video. Also, in other embodiments, the components of the personalized video generation engine 220 may process data in synchronous manner wherein each frame of the video is generated and presented in real-time. For example, while first frame of the personalized video 230 is being displayed at the user device 212, the one or more components may process the second frame in real-time and display it after the first frame of the personalized video 230.

Figure 2C:
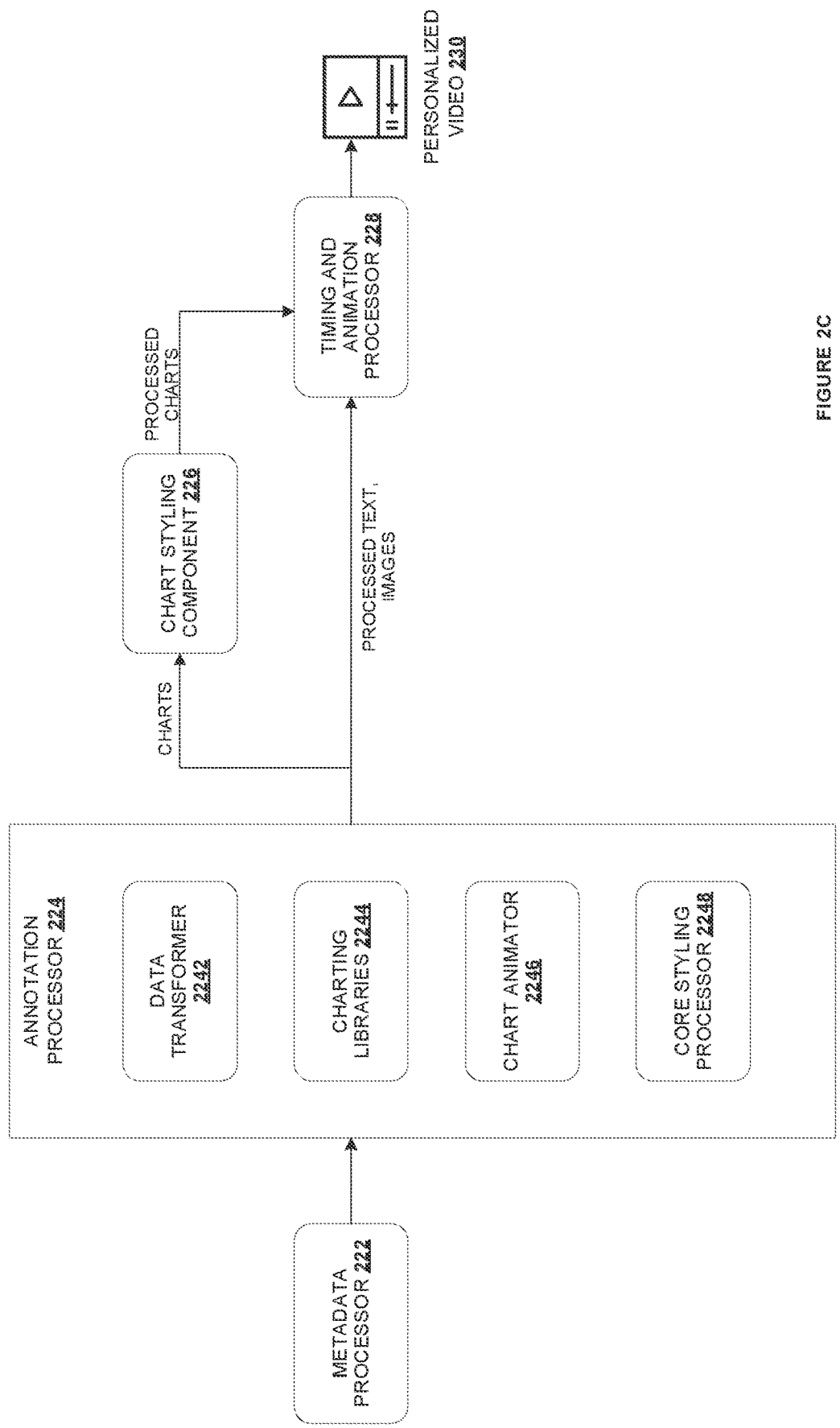
FIG. 2C is an architecture diagram illustrating chart generation components of the system for dynamic generation of charts in personalized video content, according to one or more embodiments.

FIG. 2C is an architecture diagram illustrating chart generation components of the system for dynamic generation of charts in a personalized video content, according to one or more embodiments. As described in FIG. 2B, the metadata processor 222 may be configured process metadata by parsing the metadata 206 to extract annotation data from the metadata 206 and may send the personalized annotation data along with the video template 204 and user data 210 to the annotation processor 224. The chart annotation processor may comprise one or more components, but not limited to, a data transformer 2242, charting libraries 2244, chart animator 2246 and core styling processor 2248. The data transformer 2242 may be configured to transform the user data to a graph data by using charting libraries 2244. The data transformer 2242 may receive user data in the form of natural language text, numbers or any other format that can be transformed to graphical elements. The metadata 206 associated with the video template 204 may comprise one or more parameters to each of the one or more placeholders that may be across multiple frames or limited to single frame of the video template 204. The metadata 206, for example, may comprise information such as layout size in terms of pixel values, entry and exit animations and/or display time of each of the one or more placeholders 204(*a*). Using the charting libraries 2244, the data transformer 2242 transforms the user data that needs to be displayed in the personalized video 230 to charts. The charts may of any format, but not limited to bar chart, line chart, pie chart, graphs and/or heat maps which may be defined/designed using charting libraries 2244. The charting libraries 2244 which comprise set of user defined functions which may receive user data and transform it to one or more charts. The generated one or more charts may be passed to chart animator 2246 wherein the chart animator 2246 may be configured to perform chart specific animations. In one or more embodiments, the charts are rendered on the browser with chart specific animation effects. The chart specific animation effects applied/performed by the chart animator 2246 may be within the charts and also with respect to entry and exit of charts in the video. In case of animation within the charts, it may be, for example—building up bars in a bar chart from bottom to top (from horizontal axis towards vertical axis), building bars in a bar chart from vertical axis to horizontal axis, or a quick swirl in case of pie chart etc. This configuration may be applied dynamically at run time to the annotations by chart animator 2246. Another category of animation is with respect to entry and exit of the charts in the video, which may be, but not limited to fade in, slide in, zoom in and/or bounce in at the time of entry of charts in the video and/or fade out, slide out, zoom out, bounce out etc. at the time of exit of charts in the video. The chart specific animations carried out by the chart animator 2246 may be time bound since duration of the animation is received from the metadata 206. FIG. 4 illustrates the sample frames where the animations are rendered at different at different time stamps of the personalized video. The core styling processor 2248 may be configured to apply one or more properties of text and images such, but not limited to, font size, colour of the text, opacity of the text, position and size, resolution, opacity of images, positioning, overall size and/or opacity of the charts. The processed chart may be passed to chart styling component for further processing as described in FIG. 2B.

Figure 2D:
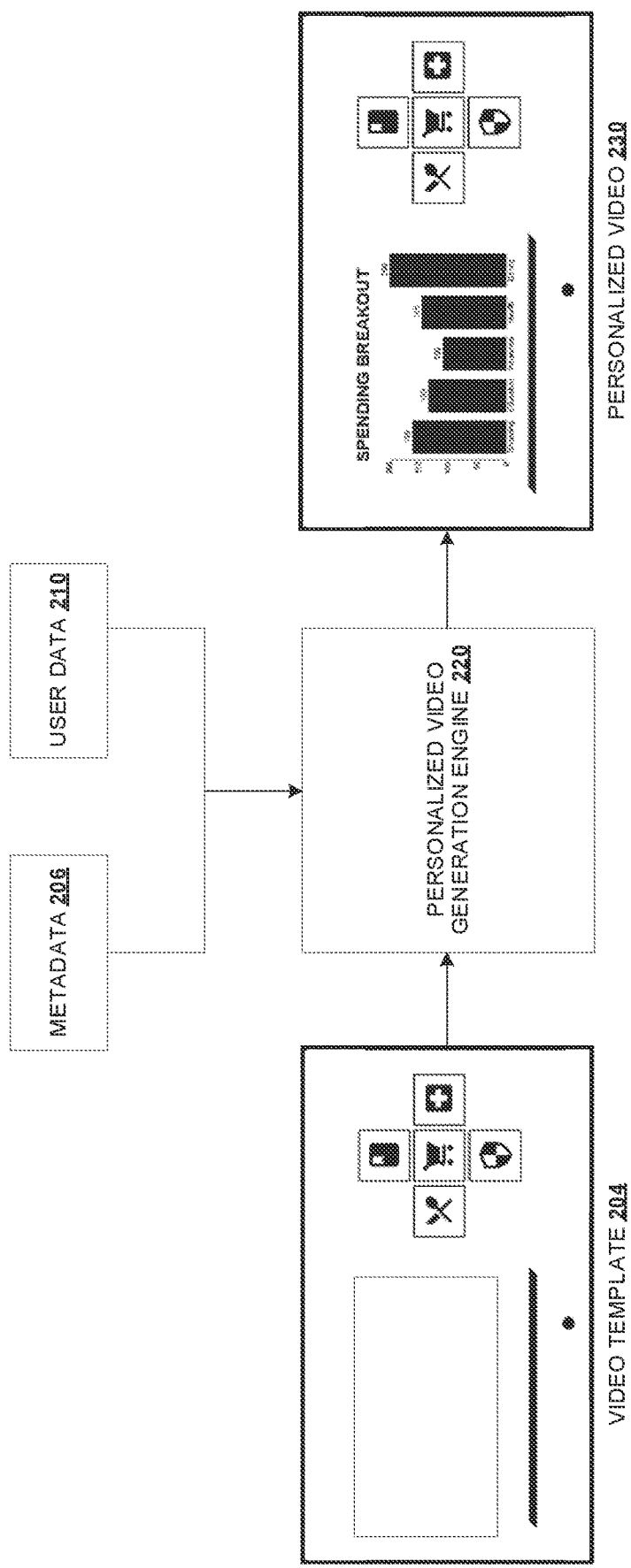
FIG. 2D is an exemplary illustration dynamic generation of charts in a personalized video content using video template, according to one or more embodiments.

FIG. 2D is an exemplary illustration dynamic generation of charts in a personalized video content using video template, according to one or more embodiments. The video template 204 as illustrated in FIG. 2D comprises one or more placeholders which is transformed to a personalized video 230 which illustrates displayed graph, which may be generated by personalized video generation engine 220 by processing video template 204, metadata 206 and user data 210 as described in various embodiments of the present disclosure.

Figure 3:
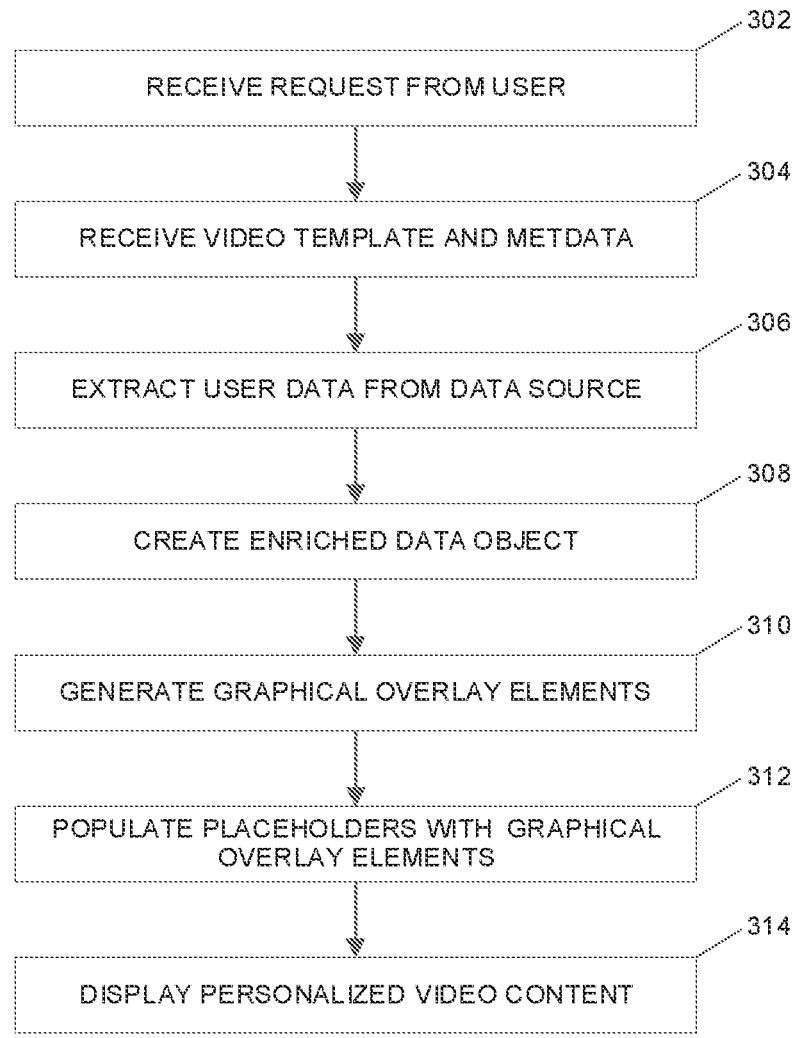
FIG. 3 is a process flow diagram illustrating a method for dynamic generation of charts in a personalized video content, according to one or more embodiments.

FIG. 3 is a process flow diagram illustrating a method for dynamic generation of dynamic charts personalized video content according to one or more embodiments. In one or more embodiments, the method comprising, receiving a request from a user to generate a personalized video at the client device, as in step 302. In other embodiments, a push notification to generate personalized video at the client device, without receiving user input at the client device. Based on the user request, at least one video template and a video configuration metadata associated with the at least one video template may be received at a client device, as in step 304. The at least one video template and the video configuration metadata may be received from a sever over a computer network or accessed as an offline file stored at the client device. The at least one video template may be selected from a set of video templates, dynamically, based on user profile, user preferences and/or capability of the client device. The capability of the client device may be in terms of hardware and/or software capacity to display a video content seamlessly. The hardware capabilities of the user device may be such as, but not limited to processor capability of the user device, display resolution of the user device, graphical processing unit capacity and/or availability at the user device. The software capabilities of the user device may be such as, but not limited to operating system installed on the client device, encoders and decoders for processing and playing a multimedia content and/or file format support. The at least one video template may comprise one or more placeholders. The one or more placeholders may be same across multiples frame of the video, may be different between each frame of the video, or may be spread across more than one frames of the selected at least one video template. The video configuration metadata may comprise customizable configuration parameters, associated with the video template in terms of layout of the one or more place holders, type of data that one or more placeholders hold, location, entry and exit animations, and/or timestamps associated with each of the one or more placeholders.

In one or more embodiments, the user data of a user may be extracted by the client device from at least one user data source, as in step 306. The one at least one user data source may be communicatively coupled to the client device over a computer network or may be locally associated with the client device. The user data may also be obtained from one or more of a geo-location of the user and/or an encoded URL. The geo-location maybe a geographical location information of the user, for example Global Positioning System (GPS) coordinates, which may be obtained from the client device enabled with geographical location identification capability and/or obtained from the web browser installed on the client device associated with the user. The user data may be received through an encoded through a URL as query parameters or relative URLs and may be received at the client device. In such cases, the user data may be extracted from the URLs or any webpage associated with the URL and such data may be extracted by parsing the webpage associated with the URL. In an example embodiment, the encoded URL may be a network path for a remote storage devices and in such cases, the user data may be accessed from such remote storage devices commutatively coupled to the client device over a computer network.

In one or more embodiments, the user data may comprise confidential information based on the pre-define attributes associated with the user data. In some cases, the user may choose to set the user data or part of user data to be confidential, by selecting attributes associated with the user data. For example, account number, mail ID and/or credit card number of the user may be 'confidential'. Also, the user may mark the account balance information as 'confidential'. In cases where the user data is marked as 'confidential' and such user data to be presented in a personalized video, the user may be authenticated before extracting the user data from the user data sources. The user may be authenticated by prompting user to enter the user ID and/or password at the client device to authenticate the user which ensures that the personalized video which may sometime comprise confidential information or any such tailored information is accessed by the intended user only. In an example embodiment, the user may log in through browser at the client device and place a request to generate a personalized video. In another example embodiment, when a push notification is sent to user to render information through a personalized video at the client device, the user may be prompted to enter credentials at the client device to initiate process of generating the personalized video at the client device with user data information fetched from at least one of, but not limited to the client device, the user data sources communicatively coupled to the client device and/or user data information sent to the client device from the server in the form of push notification. The user data for example, in case of utility bills for a user may be, but not limited to person name, bill amount, due date and/or reward points. In another example, for an auto insurance offer, the user data may be, but not limited to, purchase name, purchased vehicle make, vehicle model and/or premium amount.

In one or more embodiments, the extracted user data and the video configuration metadata may be used to create an enriched data object comprising one or more annotations, as in step 308. The video configuration metadata may comprise one or more customizable configuration parameters which are further mapped to one or more placeholders in the video template and such mapping information may be stored as part of video configuration metadata. The user data object may be parsed along with the video configuration metadata to populate one or more customizable configuration parameters with the user data to create the enriched data object.

For example, consider that user wants to see the expenses made in his account and wants to see the trend in last 5 months. The user data may be the expenses that he has made every month and the video template may comprise one or more placeholders of text format and box format layout. The text placeholder may be mapped to the user name and may be used to create welcome text to the user. The box type layout may be mapped to expenses data of the user to create bar graph. The enriched data object may be parsed at the client device to generate one or more graphical overlay elements (also termed as 'annotations'—described in various embodiments of the present disclosure) by transforming the user data to chart information, as in step 310. The transformation of user data to graphical elements/charts is described in relation to FIG. 2B and FIG. 2C. The one or more placeholders may be populated with corresponding one or more graphical overlay elements at the client device based on chart properties and the video configuration metadata, as in step 312. The chart properties may be, such as, axis labels (x-axis and/or y-axis), axis labels distance, width and height of the chart, font size, font colour and/or any such properties associated with the charts. A personalized video content may be displayed at the client device by dynamically arranging the one or more graphical overlay elements over the video template based on set of predetermined rules present in the metadata, as in step 314, i.e. when the video template is being played at the client device, for example through a browser embedded video player, the one or more graphical overlay elements are overlaid on top of the one or more pace holders of the video template, dynamically. The personalized video content may be displayed on the client device through a browser embedded video player. The personalized video content may temporarily be stored in a memory at the client device.

FIG. 4 is an exemplary illustration of various frames with timestamps of the respective frames of the personalized video content, according to one or more embodiments. The Frame-1 402 may illustrate an exemplary first frame which may be the first frame of the chart specific section of the personalized video content. Also, in other embodiments, Frame-1 402 may be an exemplary first fame of the whole personalized video content. The Frame-2 404 may be an exemplary frame illustrating beginning of the chart display with layout set with 'spending breakout' heading overlaid on the placeholder in the video template dedicated for the headings. The Frame-3 406 may illustrate an exemplary frame at a timestamp wherein the charts are overlaid on top of the placeholder dedicated for the bar charts, which also illustrates the entry animation of the bar chart (charts are partially rendered). The Frame-4 408 may illustrate an exemplary frame at a timestamp wherein the charts are overlaid in full size on the top of the dedicated placeholder (charts are fully rendered). The Frame-5 410 may illustrate an exemplary frame at a timestamp wherein the charts are implemented with exit animation (charts are faded gradually). The Frame-6 412 may be an exemplary last frame with a timestamp illustrating the end of the personalized video content.

Figure 5:
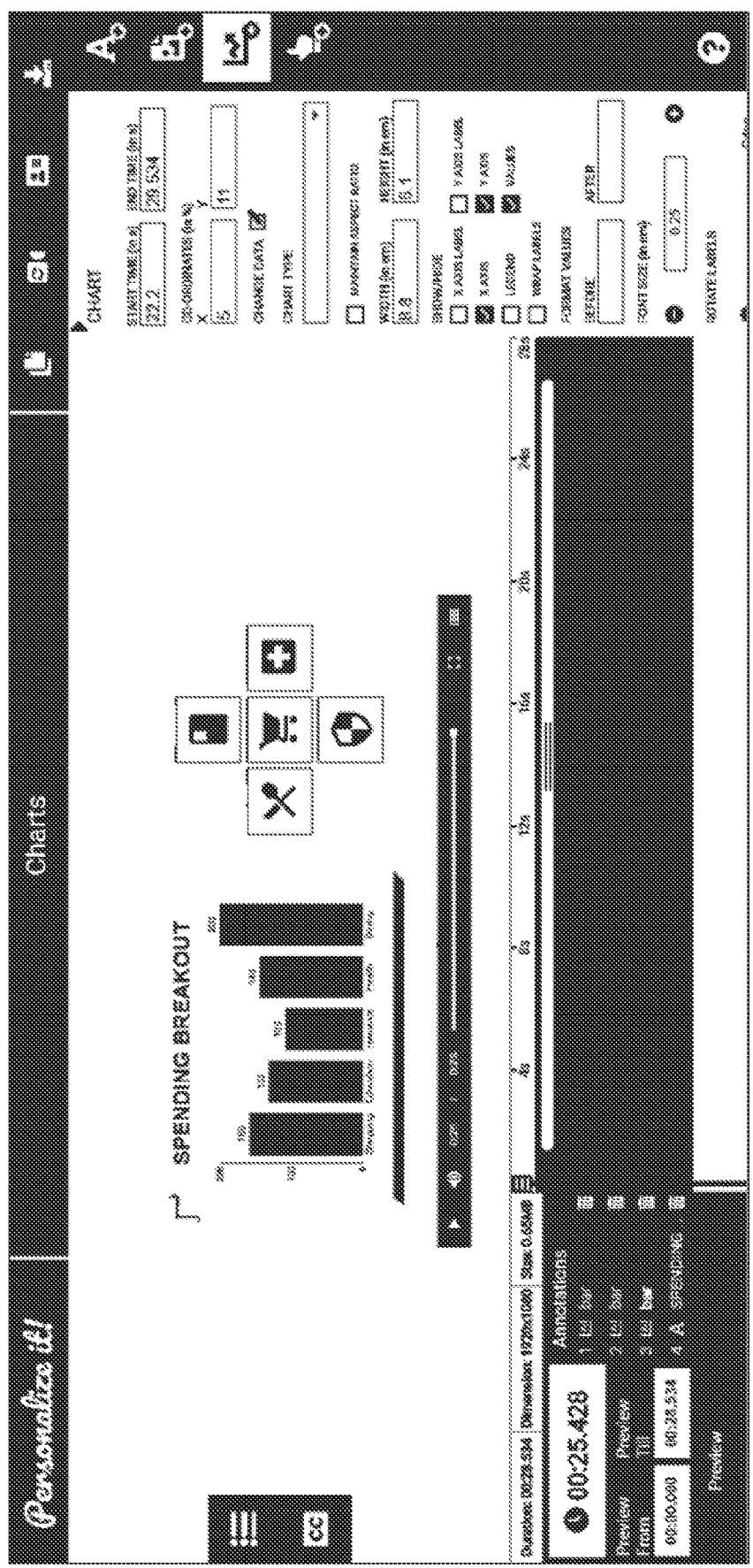
FIG. 5 is an exemplary screenshot of the user interface of PSV Studio with charts configuration options panel, according to one or more embodiments.

FIG. 5 illustrates an exemplary screenshot of the user interface of PSV Studio with charts configuration options panel. according to one or more embodiments. PSV studio may be a custom built user interface to generate a personalized video, to generate video templates and/or to configure metadata for a personalized video template which may be used to generate personalized video content with charts as disclosed in various embodiments of the present disclosure.

In an example embodiment, consider a monthly expenditure of the user to be communicated to the user based on the request received from the user. As described in various paragraphs of the present disclosure, the components of the personalized video generation engine communicate with each other to process user data and metadata, along with the video template to generate a personalized video dynamically. The user data may be received by the metadata processor of the client device. The user data may be expenses that the user has incurred in a month such as $160 for shopping, $130 for education, $100 for insurance, $200 on health and $100 on dining. These user data may be stored on a client device associated with the user or stored on a server which may be received from the server by the client device at the time of generation of personalized video. The user data may also comprise one or more preferences such as preferred time duration of video template, preferred graph/chat format, preferred weightage for graphs/charts over text and vice versa, preferred resolution and so on. Based on the user preference associated with the user data, a video template may be selected by the client device and also the metadata associated with the chosen video template. The metadata may comprise information such as type of annotation (i.e. chart in the present embodiment), various specification for charts and text such as, but not limited to, width and height of the video template and charts layout, font size, font colour, label size, label colour, axis label distance, animation duration, chart type, supported chart libraries start and end time (entry and exit time) of charts on the video and/or other styling properties such as aspect ratio, orientation, margin, background clip, opacity, background colour, padding etc. The metadata processor may identify that the type of annotation is 'chart' and may further communicate the user data, video template and the metadata to the chart annotation processor. The chart annotation processor may parse the metadata to access chart related properties such as char type, library and other settings. The charting library component may be configured to create personalized charts by combining the user data i.e. the values mentioned above with the chart specification by transforming the values in user data to graphical overlay elements or the personalized charts. The personalize charts may be communicated from the charting library component to the chart animator component for setting animation effects to be applied on the chart while rendering the personalized video. The styling properties related to height, width, positioning, color of chart bar/sections/lines/area/labels/axis, font size of axis labels may be set by the chart styling component as per the information/preferences stored in metadata. The timing and animation processor may access the start time and end time and also the timing duration of animations of the personalized charts on the video from the metadata and the personalized video may be rendered on the browser at run-time.

In one or more embodiments, a non-transitory computer readable storage medium for dynamic generation of charts in a personalized video content is disclosed. The non-transitory compute readable storage medium comprising machine executable code which when executed by at least one processor, causes the at least one processor to perform steps such as, receiving at a client device at least one video template and a video configuration metadata associated with the at least one video template. The at least one video template may comprise one or more placeholders. The video configuration metadata may comprise customizable configuration parameters. The at least one video template may be received over a computer network or accessed as an offline file stored at the client device. The at least one video template may be dynamically selected from a set of video templates, based on user profiles. The at least one video template may be dynamically selected from set of video templates, based on capabilities of the client device. User data of a user may be extracted by the client device from at least one user data source. The user data may be obtained from one or more of a geo-location of the user and/or an encoded URL. The user may be validated at the client device based on the personalized parameters extracted from the user data. The extracted user data may be appended to the video configuration metadata to generated updated an updated video configuration metadata. The updated video configuration metadata may comprise a set of user specific video configuration metadata parameters. The updated video configuration metadata may be parsed at the client device to generate one or more graphical overlay elements by transforming the user data to chart information. The one or more placeholders may be populated with corresponding one or more graphical overlay elements at the client device based on chart properties. A personalized video content may be displayed at the client device by dynamically arranging the one or more graphical overlay elements over the video template. The personalized video content may be displayed on the client device through a browser embedded video player. The display of the personalized video content indicates playing the personalized video content at the client device. The user at the client device may be allowed to control the playing of the personalized video content. The personalized video content may temporarily be stored in a memory at the client device.

The personalized video may be used to communicate personalized information to a user in way by improving the presentation to the user. For example, monthly payments information can be sent to each user in a chart based representation to analyze their spending pattern. It helps to analyze various aspects like on which month maximum amount was spent, yearly comparison to understand an increase or decrease in spending pattern and spending breakout on various categories so on.

The advantage of the technology described in the present disclosure is that the charts/images/videos are not pre-processed or created at server side before being rendered on screen for the end user. Instead the charts are overlaid in real-time on video using web technologies/browser capabilities available at the client device. The capabilities of the web technologies are harnessed to take personalized video watching experience to the next level. Instead of creating one video per person, the described technology reuses a single video template for a personalization campaign and overlay the personalization parameters including real-time charts on top of the video template using browser capabilities at the client device. The video file is not created but the video template is dynamically personalized in real-time based on user data. The disclosed technology mat be used to deliver personalized communication in Business-to-Customer (B2C) scenarios for various stages of customer interactions (e.g. prospects, onboarding, reminders) in various domains without spending much on processing power and storage resources.

The specification and drawings in the present disclosure are to be regarded in an illustrative rather than a restrictive sense.

What is claimed is:

1. A computer implemented method for dynamic generation of charts in a personalized video content, the method comprising:
    receiving, at a client device, at least one video template comprising one or more placeholders and a video configuration metadata associated with the at least one video template, based on a request from a user;
    creating, at the client device, an enriched data object based on user data extracted from at least one user data source and the received video configuration metadata;
    parsing, at the client device, the enriched data object to generate one or more graphical overlay elements by transforming the user data to a chart format comprising one of a plurality of types of charts, graphs, or maps using one or more chart libraries;
    populating, at the client device, the one or more placeholders with corresponding one or more graphical overlay elements based on chart properties; and
    displaying, at the client device, personalized video content, by dynamically arranging the one or more graphical overlay elements over the at least one video template.

2. The computer implemented method of claim 1, further comprising, authenticating the user at the client device to extract user data based on one or more preferences associated with the user data.

3. The computer implemented method of claim 1, wherein the video configuration metadata comprises one or more customizable configuration parameters.

4. The computer implemented method of claim 1, wherein the at least one video template is dynamically selected from a set of video templates.

5. The computer implemented method of claim 1, wherein the one or more customizable configuration parameters of the video configuration metadata are populated with user data to create the enriched data object.

6. The computer implemented method of claim 1, wherein the personalized video content is displayed at the client device through a browser embedded video player.

7. A computing device for dynamic generation of charts in a personalized video content, comprising:
    at least one processor;
    at least one memory unit operatively coupled to the at least one processor, having instructions stored thereon that, when executed by the at least one processor, causes the at least one processor to:
        receive at least one video template comprising one or more placeholders and a video configuration metadata associated with the at least one video template, based on a request from a user;
        create an enriched data object based on user data extracted from at least one user data source and the received video configuration metadata;
        parse the enriched data object to generate one or more graphical overlay elements by transforming the user data to a chart format comprising one of a plurality of types of charts, graphs, or maps using one or more chart libraries;
        populate the one or more placeholders with corresponding one or more graphical overlay elements based on chart properties; and
        display personalized video content, by dynamically arranging the one or more graphical overlay elements over the at least one video template.

8. The system of claim 7, further causing the at least one processor to authenticate the user to extract user data based on preferences associated with the user data.

9. The system of claim 7, wherein the video configuration metadata comprises one or more customizable configuration parameters.

10. The system of claim 7, wherein the at least one video template is dynamically selected from a set of video templates.

11. The system of claim 7, wherein the one or more customizable configuration parameters of the video configuration metadata are populated with user data to create the enriched data object.

12. The system of claim 7, wherein the personalized video content is displayed at the client device through a browser embedded video player.

13. A non-transitory computer readable medium having stored thereon instructions for dynamic generation of charts in a personalized video content, the non-transitory computer readable medium comprising machine executable code which when executed by at least one processor, causes the at least one processor to perform steps comprising:
   receiving at least one video template comprising one or more placeholders and a video configuration metadata associated with the at least one video template, based on a request from a user;
   creating an enriched data object based on user data extracted from at least one user data source and the received video configuration metadata;
   parsing the enriched data object to generate one or more graphical overlay elements by transforming the user data to a chart format comprising one of a plurality of types of charts, graphs, or maps using one or more chart libraries;
   populating the one or more placeholders with corresponding one or more graphical overlay elements based on chart properties; and
   displaying personalized video content, by dynamically arranging the one or more graphical overlay elements over the at least one video template.

14. The non-transitory computer readable medium of claim 13, further comprising, authenticating the user to extract user data based on preferences associated with the user data.

15. The non-transitory computer readable medium of claim 13, wherein the video configuration metadata comprises one or more customizable configuration parameters.

16. The non-transitory computer readable medium of claim 13, wherein the at least one video template is dynamically selected from a set of video templates.

17. The non-transitory computer readable medium of claim 13, wherein the one or more customizable configuration parameters of the video configuration metadata are populated with user data to create the enriched data object.

18. The non-transitory computer readable medium of claim 13, wherein the personalized video content is displayed at the client device through a browser embedded video player.

* * * * *